United States Patent
Reuche (10) Patent No.: US 11,665,604 B2
(45) Date of Patent: May 30, 2023

(54) METHOD AND A DEVICE FOR ANTICIPATING A RECONNECTION OF A MOBILE STATION

(71) Applicant: SAGEMCOM BROADBAND SAS, Rueil Malmaison (FR)

(72) Inventor: Anthony Reuche, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 156 days.

(21) Appl. No.: 17/414,881

(22) PCT Filed: Dec. 18, 2019

(86) PCT No.: PCT/EP2019/085832
§ 371 (c)(1),
(2) Date: Jun. 16, 2021

(87) PCT Pub. No.: WO2020/127410
PCT Pub. Date: Jun. 25, 2020

(65) Prior Publication Data
US 2022/0060951 A1    Feb. 24, 2022

(30) Foreign Application Priority Data
Dec. 20, 2018    (FR) ........................................ 1873544

(51) Int. Cl.
*H04W 4/00*        (2018.01)
*H04W 36/00*       (2009.01)
(Continued)

(52) U.S. Cl.
CPC ..... *H04W 36/00837* (2018.08); *H04W 16/22* (2013.01); *H04W 36/0085* (2018.08);
(Continued)

(58) Field of Classification Search
CPC ..... H04W 16/18; H04W 16/20; H04W 16/22; H04W 16/225; H04W 36/0083;
(Continued)

(56) References Cited

U.S. PATENT DOCUMENTS

2020/0107238 A1* 4/2020 Silberstein .......... H04L 43/0829

FOREIGN PATENT DOCUMENTS

KR    20150094936 A    8/2015

OTHER PUBLICATIONS

Feb. 2, 2020 International Search Report issued in International Patent Application No. PCT/EP2019/085832.

* cited by examiner

*Primary Examiner* — Matthew W Genack
(74) *Attorney, Agent, or Firm* — Oliff PLC (57) ABSTRACT

A method and a device for anticipating a reconnection, to a second access point, of a mobile station connected to a first access point that forms a wireless telecommunication network. The physical bit rate between the first access point and mobile station with respect to a reception power of a signal sent by a mobile station and received by the first access point from measurements of reception power of signals sent by the mobile station and received by the first access point, calculates physical bit rates between access points and mobile station. A rate of variation of the physical bit rates between access points and mobile stations from measurements obtained and from the modelling, an anticipation of physical bit rate between access points and the mobile stations and determines whether a reconnection of the station to the second access point must be made among other things from the calculated anticipations.

9 Claims, 3 Drawing Sheets

(51) Int. Cl.
*H04W 16/22* (2009.01)
*H04W 36/24* (2009.01)
*H04W 36/36* (2009.01)
*H04W 84/12* (2009.01)

(52) U.S. Cl.
CPC ......... *H04W 36/245* (2013.01); *H04W 36/36* (2013.01); *H04W 84/12* (2013.01)

(58) Field of Classification Search
CPC ..... H04W 36/00835; H04W 36/00837; H04W 36/0085; H04W 36/0088; H04W 36/0094; H04W 36/24; H04W 36/245; H04W 36/26; H04W 36/28; H04W 36/30; H04W 36/34; H04W 36/36
See application file for complete search history.

METHOD AND A DEVICE FOR ANTICIPATING A RECONNECTION OF A MOBILE STATION

TECHNICAL FIELD

The present invention relates to a method and a device for anticipating a reconnection, to a second access point, of a mobile station connected to a first access point.

PRIOR ART

Wireless telecommunications networks of the Wi-Fi type comprise a plurality of access points to enable a mobile station to access a network of the internet type when the station is connected to one of the access points of the wireless telecommunication network.

The connection of the mobile station to an access point depends on the position of the mobile station in the network formed by the access points. If the mobile station moves, it may move away from the access point to which the mobile station is connected and lose a quality of service. It will have to reconnect to another access point.

The changes in connection are referred to as intercell transfers or handovers.

The changes are often made when the mobile station leaves the coverage area of the access point to which the mobile station is connected and enters a coverage area of another access point.

These changes are often made as a result of measurements of communication parameters and, when these become too weak, a change in connection is made.

This is very often detrimental to the quality of the communication for the mobile station prior to the change in connection.

DISCLOSURE OF THE INVENTION

The aim of the present invention is to solve the drawbacks of the prior art by proposing a method and device that make it possible to anticipate a reconnection of a mobile station to an access point so as to avoid an excessively great drop in the quality of communication for the mobile station.

To this end, according to a first aspect, the invention proposes a method for anticipating a reconnection, to a second access point, of a mobile station connected to a first access point, the access points forming a wireless telecommunication network, characterised in that the method comprises the steps, performed by the first access point, of:

modelling a physical bit rate between the first access point and the mobile station with respect to a reception power of a signal sent by a mobile station and received by the first access point on the basis of measurements of reception power of signals sent by the mobile station and received by the first access point, determining levels from the modelling, measuring physical bit rates between the first access point and the mobile station, measuring reception powers of signals sent by the mobile station and received by the first access point, determining a level in which the mobile station is situated from the measurements, obtaining measurements of reception power of signals sent by the mobile station and received by the first and second access points, calculating physical bit rates between each access point and the mobile station and a rate of variation of the physical bit rates between each access point and the mobile station from the measurements obtained and from the modelling, calculating anticipations of a physical bit rate between each access point and the mobile station, determining whether a reconnection of the station to the second access point must be made among other things from the anticipations calculated.

The invention also relates to a device for anticipating a reconnection, to a second access point, of a mobile station connected to a first access point, the access points forming a wireless telecommunication network, characterised in that the device is included in the first access point and comprises:

means for modelling a physical bit rate between the first access point and the mobile station with respect to a reception power of a signal sent by a mobile station and received by the first access point on the basis of measurements of reception power of signals sent by the mobile station and received by the first access point, means for determining levels from the modelling, means for measuring physical bit rates between the first access point and the mobile station, means for measuring reception powers of signals sent by the mobile station and received by the first access point, means for determining a level in which the mobile station is situated from the measurements, means for obtaining measurements of reception power of signals sent by the mobile station and received by the first and second access points, means for calculating physical bit rates between each access point and the mobile station and a rate of variation of the physical bit rates between each access point and the mobile station from the measurements obtained and from the modelling, means for calculating anticipations of a physical bit rate between each access point and the mobile station, means for determining whether a reconnection of the station to the second access point must be made among other things from the anticipations calculated.

Thus the present invention makes it possible to anticipate a reconnection of a mobile station to an access point so as to avoid an excessively great drop in the quality of communication for the mobile station.

According to a particular embodiment of the invention, the method further comprises a step of calculating a score for each access point and in that the determination whether a reconnection of the station to the second access point must be made is determined from the scores calculated.

According to a particular embodiment, the physical bit rates between each access point and the mobile station are physical bit rates received by the mobile station.

According to a particular embodiment of the invention, the first access point transfers to the second access point the modelling of the physical bit rate between the first access point and the mobile station with respect to the reception power of the signal sent by the mobile station and received by the first access point.

According to a particular embodiment of the invention, the modelling is obtained from first, second and third affine straight lines, the director coefficient and the ordinate of the second affine straight line are determined for each mobile station from physical measurements of bit rate between the first access point and the mobile station with respect to a reception power of a signal sent by a mobile station and received by the first access point.

According to a particular embodiment of the invention, the director coefficient is determined from a mean of measurements, half of the measurements are greater than 50% of the maximum physical bit rate between the first access point and the mobile station and less than 80% of the maximum physical bit rate between the first access point and the mobile station, the other half of the measurements are less than 50% of the maximum physical bit rate between the first access point and the mobile station and greater than 20% of the maximum physical bit rate between the first access point and the mobile station.

According to a particular embodiment of the invention, the modelling is obtained by defining, around the affine straight lines, an area determined from a predetermined percentage of the maximum physical bit rate between the first access point and the mobile station.

The invention also relates to the computer programs stored on an information carrier, said programs comprising instructions for implementing the previously described methods, when they are loaded into and executed by a computer system.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
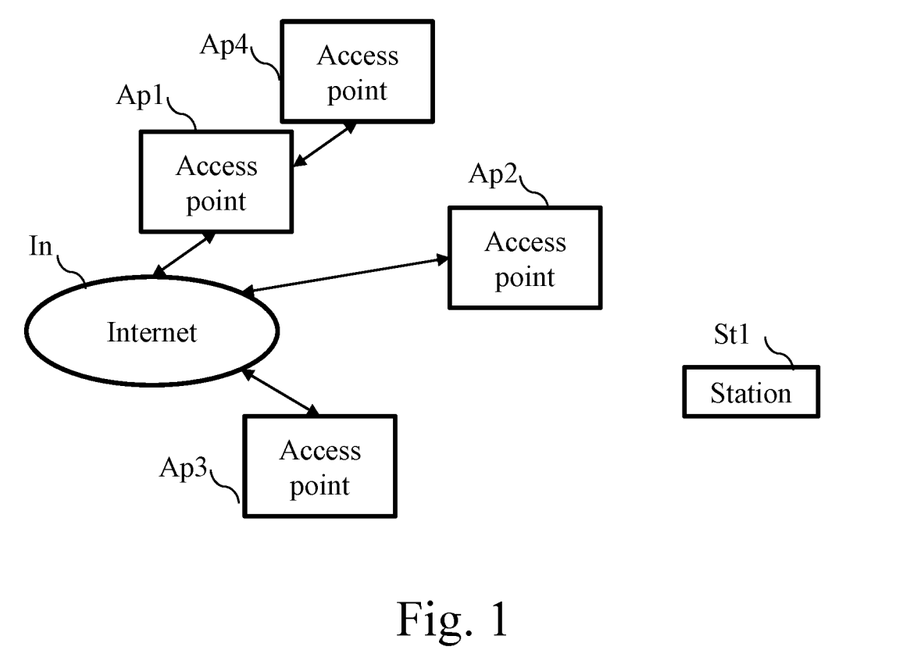
FIG. 1 shows a telecommunication system wherein the present invention is implemented.

FIG. 1 shows a telecommunications system wherein the present invention is implemented.

The system comprises a plurality of access points denoted Ap1, Ap2, Ap3 and Ap4 that, when a mobile station St1 is connected to an access point among the access points Ap1, Ap2, Ap3 or Ap4, make it possible to access a communication network of the internet type In via a residential gateway, not shown in FIG. 1.

In the example in FIG. 1, the access point Ap4 is connected to the communication network In by means of the access point Ap1.

The connection of the mobile station St1 to an access point depends on the position of the mobile station in the network formed by the access points Ap1, Ap2 and Ap3. If the mobile station moves, it may move away from the access point to which the mobile station is connected and lose a quality of service. It will have to reconnected to another access point.

Wi-Fi performance is subject to a plurality of parameters relating to the environment of the access point and of the mobile station St1. Several types of interference may influence these parameters independently of each other. Because of the complexity of the interferences, which are often cumulative, it is difficult to predict the quality of the Wi-Fi physical connection over a sufficiently long period to be able, for example, to send a relevant alert relating to a poor quality of the Wi-Fi connection and to direct a station to another access point.

The present invention uses the communication parameters that are the measurement of the reception power of a received signal or RSSI, the acronym for Received Signal Strength Indicator, and the physical bit rate between the access point and the mobile station (Phy-Rate) for modelling the connection between the access point and the mobile station and characterising the performance level of the physical bit rate of the connection in relation to the level of attenuation between the access point and the mobile station in an environment without consideration of noise for predicting a reconnection of the mobile station to another access point.

In a preferred embodiment, the physical bit rate taken into account is the physical bit rate received by the mobile station and the RSSI considered is the one seen by the access point because of the fact that the modelling must be applicable to all the mobile stations.

Figure 2:
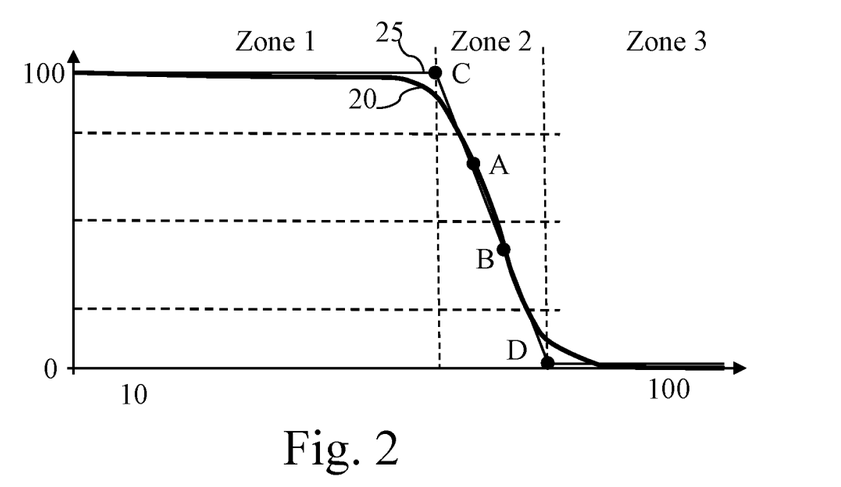
FIG. 2 shows an example of a curve of variation of the physical bit rate of a link between a mobile station and an access point according to the reception power of a signal sent by a mobile station and received by an access point.

The present invention models a function Phy-Rate=f (RSSI) based on the principle that the mathematical function is a curve in the form of an inverted S, as shown in FIG. 2.

FIG. 2 shows an example of a curve of variation of the physical bit rate of a link between a mobile station and an access point as a function of the reception power of a signal sent by a mobile station and received by an access point.

The curve in a bold line denoted 20 represents the function of variation of the physical bit rate of a link between a mobile station and an access point as a function of the reception power of a signal sent by a mobile station.

The curve 20 is, according to the present invention, modelled by the curve 25 shown in fine lines.

The curve 25 is divided into three parts denoted Zone 1, Zone 2 and Zone 3.

The Zone 1 part comprises the part of the curve 25 for which the Phy-Rate, represented as a percentage with respect to the maximum Phi-Rate, is close to or equal to the maximum Phi-Rate rate PhyRatemax. The function Phy-Rate=f (RSSI) in the Zone 1 part is Phy-Rate=PhyRatemax.

The Zone 2 part comprises the part of the curve 25 for which the Phy-Rate level decreases with respect to the reduction in RSSI. The part of the curve 25 in the Zone 2 part is modelled by an equation of the form PhyRate=m*|RSSI|+p.

The Zone 3 part comprises the part of the curve 25 for which the Phy-Rate is close to or equal to zero. The function Phy-Rate=f (RSSI) in the Zone 3 part is Phy-Rate=0.

Concerning the part of the curve 25 included in the Zone 2 part, the coefficients m and p must be adjusted for each mobile station. This is because the mobile stations have different performances because of their own set of radio chips, antennas, noises and electromagnetic interferences. From an initial curve, the adjustment is made using samples (PhyRate, RSSI) coming from pilot signals.

The initial curve depends on the type of mobile station. For example, the coefficient m is equal to −16 and the coefficient p is equal to 1333 for a maximum Phyrate of 500 Mbps.

The coefficient m being related to the slope, the calculation is done by means of two samples of (PhyRate, RSSI) denoted A and B in FIG. 2 and by effecting a mean on the last ten coefficients m calculated in order to reduce the impact of the measurement errors;

$$m_n = \frac{\frac{PhyRate_A - PhyRate_B}{|RSSI_A| - |RSSI_B|} + \sum_{i=1}^{9} m_{n-i}}{10}$$ [Math 1]

where $m_n$ is the coefficient m of index n, $PhyRate_A$ is the PhyRate rate measured at the point A, $PhyRate_B$ is the PhyRate measured at the point B, $RSSI_A$ is the RSSI measured at the point A and $RSSI_B$ is the RSSI measured at the point B.

It should be noted here that, in the case of absence of coefficients $m_{n-i}$, they are replaced by the value of the coefficient m of the initial curve.

For the coefficient m to approach the real case, the samples A and B must respect the following rules:

Be centred on the part of the curve of the zone 2, that is to say a coefficient must be located in the part higher than 50% of the PhyRateMax and the other coefficient must be located in the part lower than 50% of the PhyRateMax.

A sample must be less than 80% of the PhyRateMax and the other coefficient must be greater than 20% of PhyRatemax.

The samples A and B must be sufficiently distant to reduce the slope calculation error.

$PhyRate_A$<PhyRateMax * 80% and $PhyRate_A$>(PhyRateMax * 50%)

$PhyRate_B$<PhyRateMax * 50% and $PhyRate_B$>(PhyRateMax * 20%)

$|RSSI_B|-|RSSI_B|$>5 dB.

The coefficient p is calculated with the following formula for the sample A ($PhyRate_A$, $RSSI_A$)

$p = PhyRate_A/(m_n*|RSSI_A|)$

The points of intersection of the parts of the curve 25 denoted C and D are calculated in the following manner:

$PhyRate_C$=PhyRateMax
$PhyRate_D$=0
$|RSSI_C|$=(PhyRateMax-p)/$m_n$
$|RSSI_D|$=p/$m_n$ A pair (PhyRate, RSSI) resulting from a real sampling cannot exactly correspond to the mathematical model defined above. This is why a valid zone is defined around this mathematical curve for which the pairs (PhyRate, RSSI) are considered to be valid.

The valid zone is defined via the following parameters:
PhyRateValid=10%*PhyRateMax Thus a sample denoted X ($PhyRate_X$, $RSSI_X$) is considered to be valid if [|PhyRate|=f ($RSSI_X$)]−PhyRateValid≤$PhyRate_X$≤[PhyRate=f($RSSI_X$)]+PhyRateValid or $PhyRate_X$>PhyRateMax Wherein PhyRate=f($RSSI_X$) is the PhyRate calculated from the curve 25.

In the case where there exists a difference greater than 10% between the initial curve and the measurements corresponding to the part of the curve 25 situated in the Zone 2, a dynamic tolerance is applied to PhyRateValid for the first seven calculations of the equation of the zone 2:

At the first calculation, PhyRateValid=80% * PhyRateMax

At the second calculation, PhyRateValid=70% * PhyRateMax

At the third calculation, PhyRateValid=60% * PhyRateMax

At the fourth calculation, PhyRateValid=50% * PhyRateMax

At the fifth calculation, PhyRateValid=40% * PhyRateMax

At the sixth calculation, PhyRateValid=30% * PhyRateMax

At the seventh calculation, PhyRateValid=20% * PhyRateMax.

The management of the weak coverage of the mobile station is based on the model

PhyRate=f (RSSI). This model is unique for each mobile station and per frequency band, for example 2.4 GHz or 5 GHz. For the predictive reconnection, it is considered that only a mobile station receiving or sending data is considered.

Figure 3:
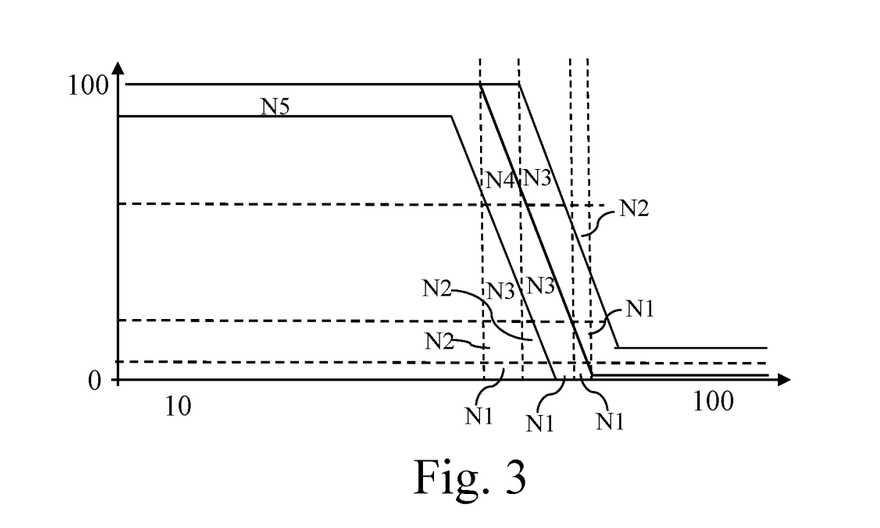
FIG. 3 shows an example of the various coverage levels obtained from the curve of variation of the physical bit rate of a link between a mobile station and an access point according to the reception power of a signal sent by a mobile station and received by an access point.

On the basis of this modelling, thresholds related to the Phy level and to the RSSI are defined to characterise the coverage levels between 1 (poor coverage) and 5 (good coverage).

PhyRateHigh=PhyRateMax
PhyRateMedium=PhyRateMax * 60%
PhyRateLow=PhyRateMax * 20%
PhyRateOut=PhyRateMax * 5%
|RSSIHigh|=(PhyRateHigh-p)/m
|RSSIMedium|=(PhyRateMedium-p)/m
|RSSILow|=(PhyRateLow-p)/m
|RSSIOut|=(PhyRateOut-p)/m The rules for defining the coverage levels are as follows:

Level 5 PhyRate≥PhyRateMedium and |RSSI|≤RSSIHigh

Level 4 PhyRate≥PhyRateMedium and RSSI>RSSIHigh and RSSI≤RSSIMedium

Level 3 (PhyRate≥PhyRateLow and RSSI>RSSIMedium and RSSI≤RSSILow) or (PhyRate≥PhyRateLow and PhyRate<PhyRateMedium and RSSI≤RSSIMedium)

Level 2 (PhyRate≥PhyRateOut and RSSI> RSSILow and RSSI≤RSSIOut) or (PhyRate≥PhyRateOut and PhyRate <PhyRateLow and RSSI≤RSSILow)

Level 1 PhyRate <PhyRateOut or |RSSI|> RSSIOut.

An example of the various levels is given with reference to FIG. 3.

FIG. 3 shows an example of the various coverage levels obtained from the curve of variation of the physical bit rate of a link between a mobile station and an access point as a function of the reception power of a signal sent by a mobile station and received by an access point.

In FIG. 3, the level 1 is denoted N1, the level 2 is denoted N2, the level 3 and denoted N4 and the level 5 is denoted N5.

The mechanism for reconnection to another access point is based on the anticipation of the future value of the pair (RSSI, PhyRate) for the next 10 seconds. If it is considered that this pair will be situated in a weak coverage area, a transfer or reconnection to another access point is initiated. This transfer requires a selection of the access point to which the mobile station will be directed. To determine this access point, a pretransfer is made by anticipating the performances of the mobile station on the future access point.

The objective of the pretransfer is to determine the best access point to which the mobile station could be directed.

If the current coverage area is below the level 4, a monitoring of the mobile station is then initiated by the access point over the complete Wi-Fi system. Each access point to which the mobile station is not connected makes measurements for the mobile station and every 10 seconds transmits the following information to the access point to which the mobile station is connected.

The measurements are the measurement of the RSSI.

The value of the RSSI is the mean value of 5 samples collected every 2 seconds and which belong to the valid area, the value of the RSSI is given by:

$$RSSI_n = \frac{\sum_{i=1}^{5}|RSSI_i|}{5} \quad \text{[Math 2]}$$

A value $v_{RSSI}$ representing the rate of change of the RSSI is the image of its change per second and is based on the mean speed of the 5 samples collected every 2 seconds and which belong to the valid area, the value $v_{RSSI}$ is given by:

$$v_{RSSI_n} = \frac{\sum_{i=1}^{5}|RSSI_i| - |RSSI_{i-1}|}{10} \quad \text{[Math 3]}$$

On the basis of this information, the access point to which the mobile station is connected calculates, for each access point, including itself, a prediction of the value of the RSSI and a prediction of the value $v_{RSSI}$.

The calculation is made every 10 seconds with the samples (RSSI, PhyRate) collected for calculating the value of $RSSI_n$ and $v_{RSSIn}$ in accordance with the following formulae:

PhyRate$_{n+1}$=$f$(|RSSI$_{n+1}$|)

For

|RSSI$_{n+1}$|=(|RSSI$_n$|)+$v_{RSSIn}$* $t$

Where t=10s

To choose the best access point, a performance score is calculated for the last minute elapsed and the prediction according to the following formula:

$$HandoverScore = \frac{\sum_{n=-5}^{0} RSSI_n + RSSI_{n+1}}{7} \quad \text{[Math 4]}$$

If a reconnection to another access point is made, a time delay of 5 minutes is triggered during which no reconnection can be made unless the coverage level is below 3.

Figure 4:
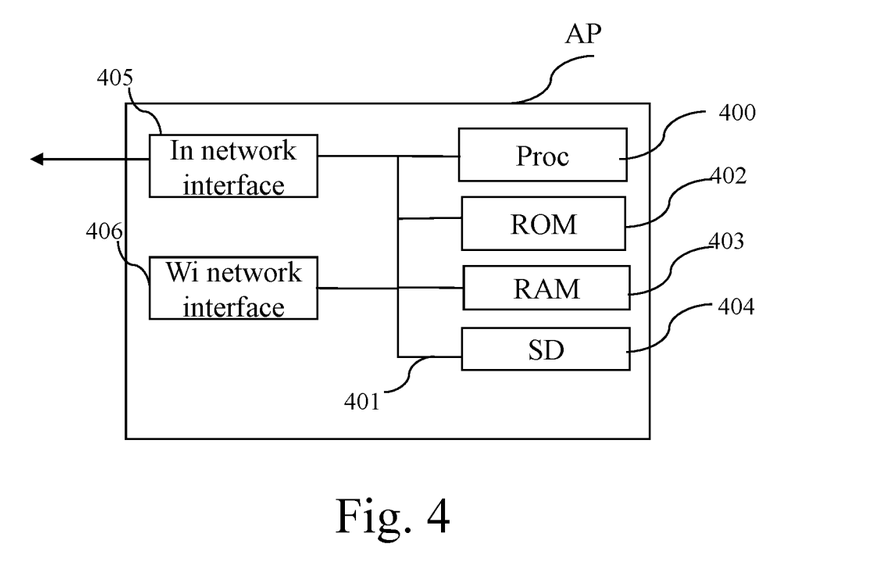
FIG. 4 shows an example of architecture of an access point wherein the present invention is implemented.

FIG. 4 shows an example of architecture of an access point wherein the present invention is implemented.

The access point AP comprises:
a processor, microprocessor or microcontroller 400;
a volatile memory 403;
a non-volatile memory 402;
optionally, a storage medium reader 404, such as an SD card (Secure Digital card) reader or a hard disk for storing the documents processed by the present invention;
a network interface 405 for communicating with the network In,
a Wi-Fi network interface 406,
a communication bus 401 connecting the processor 400 to the ROM memory 403, to the RAM memory 403, to the storage medium reader 404 and to the network interfaces 205 and 206.

The processor 400 is capable of executing instructions loaded in the volatile memory 203 from the non-volatile memory 402, from an external memory (not shown), from a storage medium such as an SD card or the like, or from a communication network. When the access point AP is powered up, the processor 400 is capable of reading instructions from the volatile memory 403 and executing them. These instructions form a computer program that causes the implementation, by the processor 400, of all or part of the method described in relation to FIG. 5.

Figure 5:
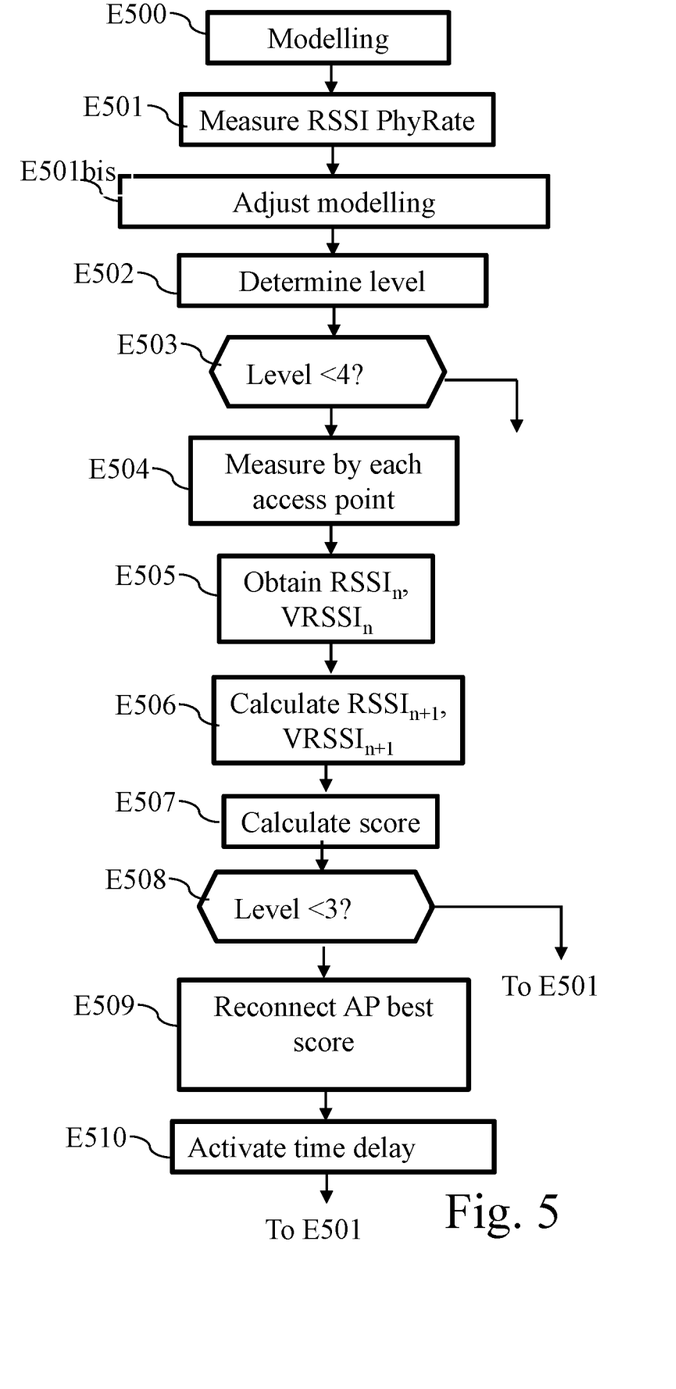
FIG. 5 shows an example of an algorithm executed by an access point according to the present invention.

All or part of the method described in relation to FIG. 5 can be implemented in software form by executing a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 5 shows an example of an algorithm executed by an access point according to the present invention.

The present algorithm is described in an example wherein it is executed by the processor 400.

At the step E500, the processor 400 implements a modelling of the physical bit rate between the first access point and the mobile station with respect to the reception power of a signal sent by a mobile station and received by the first access point from measurements of reception power of signals sent by the mobile station and received by the first access point.

The physical bit rates between each access point and the mobile station are the physical bit rates received by the mobile station.

The modelling is obtained from first, second and third affine straight lines, the director coefficient and the ordinate of the second affine straight line are determined for each mobile station from physical measurements of bit rate between the first access point and the mobile station with respect to a reception power of a signal sent by a mobile station and received by the first access point.

The director coefficient is determined from a mean of measurements, half of the measurements are above 50% of the maximum physical bit rate between the first access point and the mobile station and below 80% of the maximum physical bit rate between the first access point and the mobile station, the other half of the measurements are below 50% of the maximum physical bit rate between the first access point and the mobile station and above 20% of the maximum physical bit rate between the first access point and the mobile station.

The modelling is obtained by defining, around affine straight lines, a given zone from a predetermined percentage of the maximum physical bit rate between the first access point and the mobile station.

At this same step, the processor 400 defines coverage levels as described with reference to FIG. 2.

At this same step, the processor 400 optionally transfers to the other access points the modelling of the physical bit rate between the first access point and the mobile station with respect to the reception power of the signal sent by the mobile station and received by the access point.

At the step E501, the processor 400 instructs the Wi-Fi interface 406 so that measurements are made of physical bit rates between the first access point and the mobile station as well as measurements of reception powers of signals sent by the mobile station and received by the first access point.

At the step E501bis, the processor 400 optionally makes an adjustment of the modelling as described with reference to FIG. 2 using the measurements of physical bit rates between the first access point and the mobile station as well as the measurements of reception powers of signals sent by the mobile station and received by the first access point obtained at the step E501.

At the step E502, the processor 400 determines the level in which the mobile station is situated from the measurements as described with reference to FIG. 2.

At the step E503, the processor 400 checks whether the level determined at the step E502 is below the level 4.

If so, the processor 400 passes to the step E503. If not, the processor 400 interrupts the present algorithm.

At the step E504, the processor 400 instructs each access point to make measurements as described with reference to FIG. 2.

At the step E505, the processor 400 obtains measurements of reception power of signals sent by the mobile station and received by each access point as described with reference to FIG. 2 and calculates the physical bit rates between each access point and the mobile station and the rate of variation of the physical bit rates between each access point and the mobile station from the measurements obtained and the modelling as described with reference to FIG. 2.

At the step E506, the processor 400 makes a calculation of anticipations of a physical bit rate between each access point and the mobile station as described with reference to FIG. 2.

At the step E507, the processor 400 calculates a score for each access point as described with reference to FIG. 2.

At the step E508, the processor 400 checks whether the level determined at the step E502 is below the level 3.

If so, the processor 400 passes to the step E509. If not, the processor 400 returns to the step E501.

At the step E509, the processor 400 determines that a reconnection of the mobile station to the second access point must be made on the basis of the scores calculated as described with reference to FIG. 2.

At the step E510, the processor 400 activates the time delay of 5 minutes during which no reconnection can be made unless the coverage level is below 3.

The invention claimed is:

1. A method for anticipating a reconnection, to a second access point, of a mobile station connected to a first access point, the access points forming a wireless telecommunication network, wherein said method causes the first access point to perform:
    modelling a physical bit rate between the first access point and the mobile station with respect to a reception power of a signal sent by a mobile station and received by the first access point on the basis of measurements of reception power of signals sent by the mobile station and received by the first access point,
    determining levels from the modelling, the levels being defined from the physical bit rate between the first access point and the mobile station and the reception power of a signal sent by a mobile station and received by the first access point,
    measuring physical bit rates between the first access point and the mobile station,
    measuring reception powers of signals sent by the mobile station and received by the first access point,
    determining a level in which the mobile station is situated from the measurements,
    checking whether the level in which the mobile station is situated is below one of the levels determined from the modelling and, if so, the method further comprises the steps of:
        obtaining measurements of reception power of signals sent by the mobile station and received by the first and second access points,
        calculating a value of the reception power of a signal sent by the mobile station and received by the first access point and a rate of variation of the reception power of a signal sent by the mobile station and received by the first access point from the measurements obtained and from the modelling,
        calculating, from the value of the reception power of a signal sent by the mobile station and received by the first access point and from the rate of variation of the reception power of a signal sent by the mobile station and received by the first access point that were calculated, anticipations of a physical bit rate between each access point and the mobile station,
        determining whether a reconnection of the station to the second access point must be made among other things from the anticipations calculated.

2. The method according to claim 1, wherein said method causes the first access point to calculate a score for each access point and the determination whether a reconnection of the station to the second access point must be made is determined from the scores calculated.

3. The method according to claim 1, wherein the physical bit rates between each access point and the mobile station are physical bit rates received by the mobile station.

4. The method according to claim 1, wherein said method causes the first access point to transfer, to the second access point, the modelling of the physical bit rate between the first access point and the mobile station with respect to the reception power of the signal sent by the mobile station and received by the first access point.

5. The method according to claim 1, wherein the modelling is obtained from first, second and third affine straight lines, the director coefficient and the ordinate of the second affine straight line are determined for each mobile station from physical measurements of bit rate between the first access point and the mobile station with respect to a reception power of a signal sent by a mobile station and received by the first access point.

6. The method according to claim 5, wherein the director coefficient is determined from a mean of measurements, half of the measurements are above 50% of the maximum physical bit rate between the first access point and the mobile station and below 80% of the maximum physical bit rate between the first access point and the mobile station, the other half of the measurements are below 50% of the maximum physical bit rate between the first access point and the mobile station and above 20% of the maximum physical bit rate between the first access point and the mobile station.

7. The method according to claim 6, wherein the modelling is obtained by defining, around the affine straight lines, an area determined from a predetermined percentage of the maximum physical bit rate between the first access point and the mobile station.

8. A nontransitory storage mcansmedium that stores a computer program comprising instructions for implementing, by a device, the method according to claim 1when said program is executed by a processor of said device.

9. A device for anticipating a reconnection, to a second access point, of a mobile station connected to a first access point, the access points forming a wireless telecommunication network, wherein the device is included in the first access point and comprises circuitry causing the device to perform:

modelling a physical bit rate between the first access point and the mobile station with respect to a reception power of a signal sent by a mobile station and received by the first access point on the basis of measurements of reception power of signals sent by the mobile station and received by the first access point, determining levels from the modelling, the levels being defined from the physical bit rate between the first access point and the mobile station and the reception power of a signal sent by a mobile station and received by the first access point, measuring physical bit rates between the first access point and the mobile station, measuring reception powers of signals sent by the mobile station and received by the first access point, determining a level in which the mobile station is situated from the measurements, checking whether the level in which the mobile station is situated is below one of the levels determined from the modelling and, if so, means for activating:

obtaining measurements of reception power of signals sent by the mobile station and received by the first and second access points, calculating a value of the reception power of a signal sent by the mobile station and received by the first access point and of a rate of variation of the reception power of a signal sent by the mobile station and received by the first access point from the measurements obtained and from the modelling, calculating, from the value of the reception power of a signal sent by the mobile station and received by the first access point and from the rate of variation of the reception power of a signal sent by the mobile station and received by the first access point that were calculated, anticipations of a physical bit rate between each access point and the mobile station, determining whether a reconnection of the station to the second access point must be made among other things from the anticipations calculated.

* * * * *